Dec. 9, 1930.   E. SPENGEMAN   1,784,031
TIMING APPARATUS
Filed Sept. 13, 1928   2 Sheets-Sheet 1
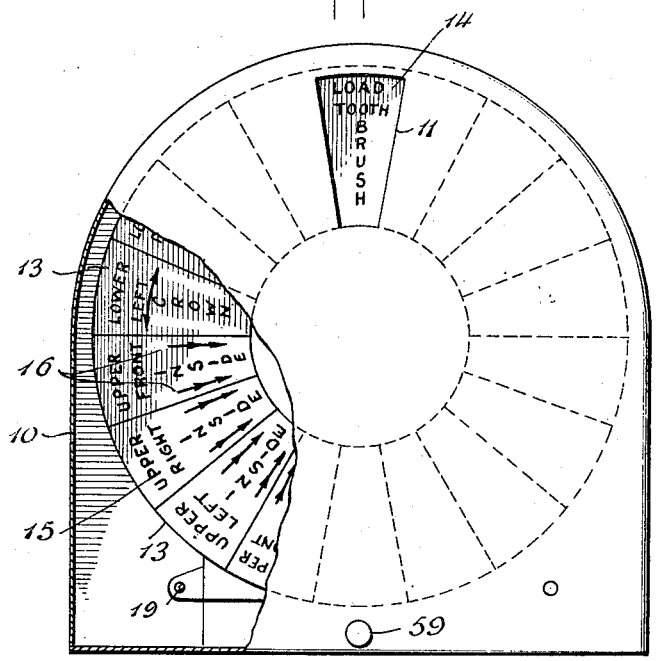
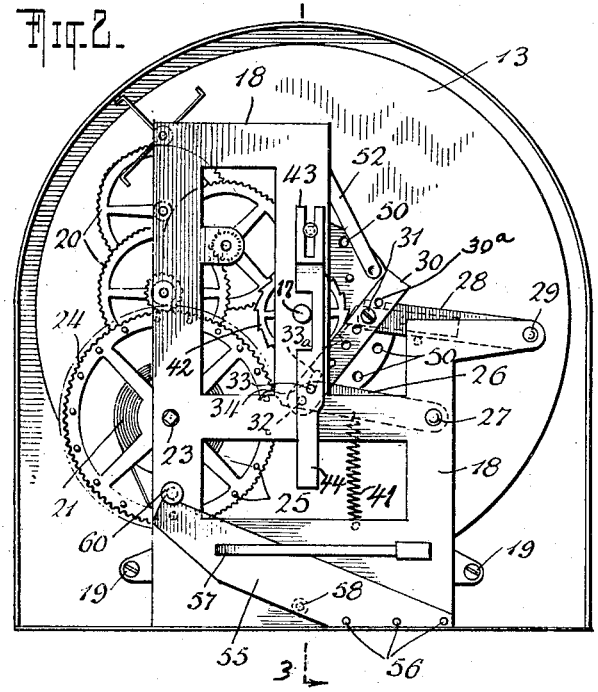
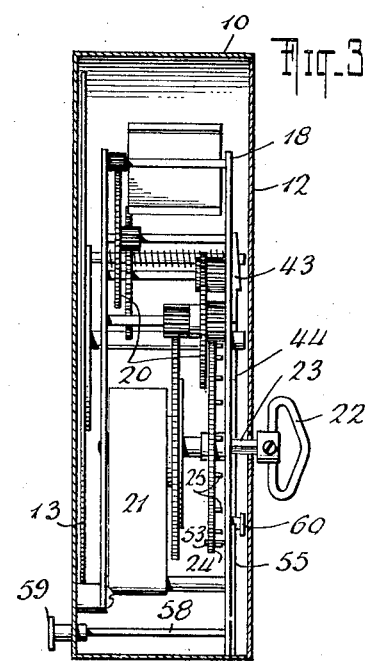
INVENTOR
EDWIN SPENGEMAN
BY
ATTORNEYS

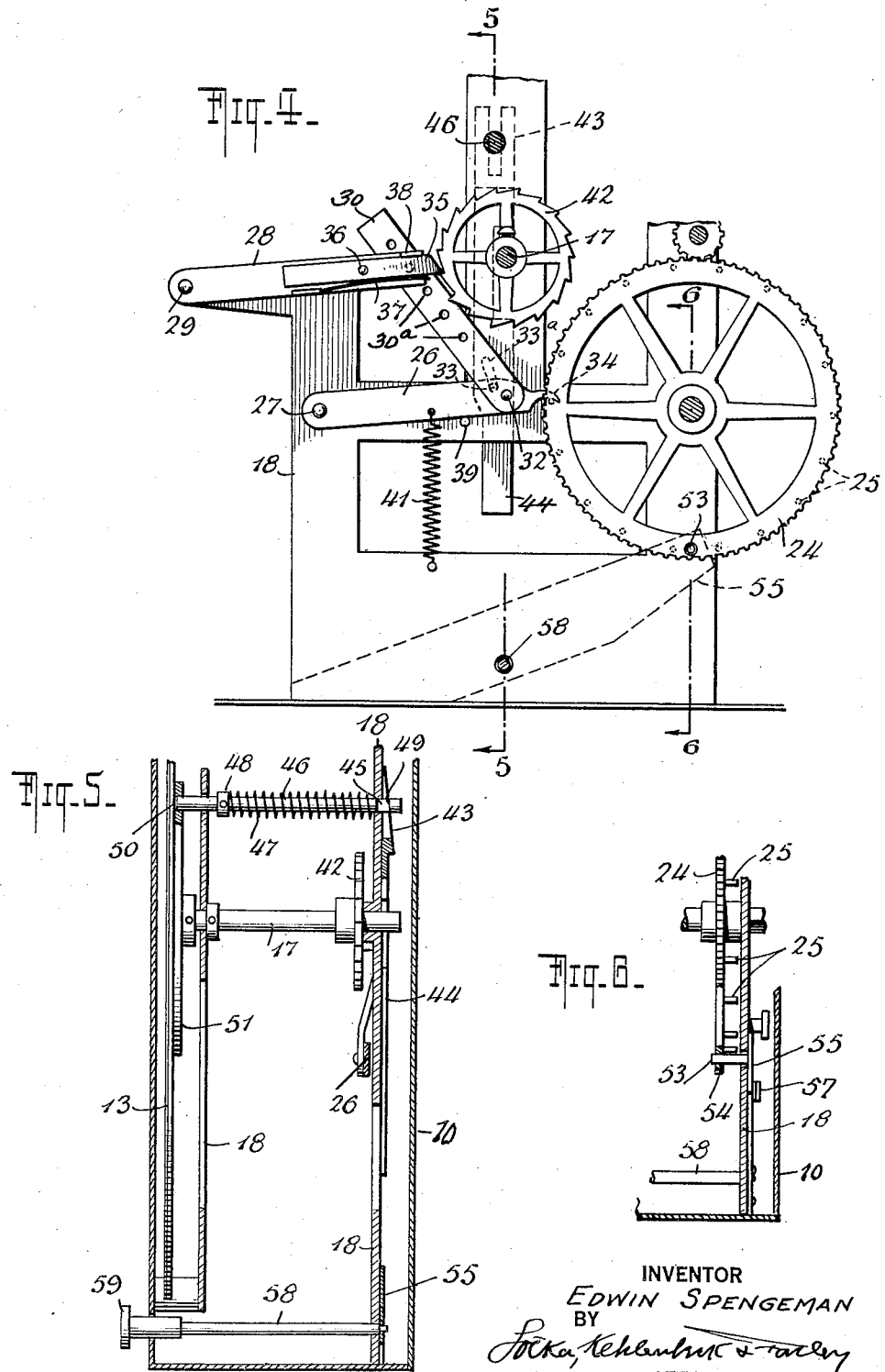

Patented Dec. 9, 1930

1,784,031

UNITED STATES PATENT OFFICE

EDWIN SPENGEMAN, OF NEW YORK, N. Y.

TIMING APPARATUS

Application filed September 13, 1928. Serial No. 305,637.

The invention relates to timing apparatus and has for its object to provide an apparatus of simple construction for automatically indicating successive fractions of a time period, each of predetermined duration, and the sum total of which represents a predetermined time period. The particular purpose of the invention is to provide a dental clock constructed and arranged to operate as a scientific combination tooth brushing instructor and timer. Other objects will appear from the description hereinafter and the features of novelty will be pointed out in the claims.

In the accompanying drawings, which illustrate an example of the invention without defining its limits, Fig. 1 is a front elevation, partly broken away, of the timing apparatus in the form of a dental clock; Fig. 2 is a rear elevation with the cover removed; Fig. 3 is a sectional elevation on the line 3—3 of Fig. 2; Fig. 4 is a detail view on an enlarged scale of tripping mechanism included in the apparatus; Fig. 5 is a fragmentary section on the line 5—5 of Fig. 4; and Fig. 6 is a similar view on the line 6—6 of Fig. 4.

In the drawings, the timing apparatus is shown in the form of a dental clock, constructed to operate as a combination tooth brush instructor and timer, and having for its purpose to teach the correct manner of using a tooth brush and the proper amount of time to be used in the brushing operation. While the novel timing apparatus is particularly adapted and designed for the above indicated purpose, it is to be distinctly understood that it may be used with equal facility for other timing purposes, and the description and claims are to be construed accordingly.

In its illustrated form the timing apparatus comprises a casing 10 of suitable dimensions, and preferably of an ornamental form best adapted for the purpose for which it is intended; in any case the casing 10 is provided with a suitably located and shaped sight opening 11, and in the preferred form includes a movable or removable cover 12, for instance, at the rear thereof. A movable indicating member illustrated in the form of a dial 13 is arranged to make one complete revolution across the sight opening 11 in a predetermined timed period, and on that face which is visible through said opening 11, is divided into a plurality of panels or sectors 14, each containing an inscription 15 appropriate to the operation of brushing the human teeth or other purpose for which the apparatus is designed. In the case of the dental clock illustrated in the drawing, each panel or sector 14 of the dial 13 contains arrows 16, designating the directions in which the tooth brush is to be manipulated to produce the most efficient and beneficial results, it being understood that these arrows may be replaced by other designations appropriate to any other operations which the apparatus may be designed to time. To provide the desired rotation of the dial 13, it is fixed upon a shaft 17 journaled in a framework 18 of suitable form and dimensions and secured in the casing in any convenient manner, as by means of screws or the like 19.

Any suitable mechanism may be provided for intermittently rotating the dial 13 to bring successive panels or sectors 14 thereof into view through the sight opening 11 and to cause them to remain at rest in such position for predetermined fractions of the time period during which the dial 13 makes one complete revolution; during such periods of rest, the inscriptions 15 in the successive sectors remain in sight through the opening 11, said periods of rest being computed with respect to the operations to which they are appropriate, and in the illustrated example indicating the duration of the various brushing steps incident to a complete brushing of the teeth. In the illustrated example, the mechanism in question comprises a clockwork 20, mounted in the frame 18 in any suitable manner and arrangement, and driven by means of a spring 21 arranged to be periodically wound up through the medium of a winding key 22 and a winding spindle 23; for the purpose of bringing about the aforesaid intermittent operation of the dial 13, the clockwork 20 includes what may be termed for convenience of description, a "master gear"

24, provided at spaced intervals with tripping devices illustrated in the form of pins 25 projecting outwardly from one face of said master gear 24, as shown in Fig. 6. The spacing apart of the pins 25 or their equivalent may be uniform, or the distances between different pins or corresponding devices 25 may vary in accordance with the purposes for which the apparatus is designed, and the duration of the fractions of the complete timing period during which the dial 13 or other movable indicating member is to remain successively at rest. The tripping devices 25 are effective upon a linkage system which, in the illustrated example, consists of a main link 26, pivoted at 27 upon the frame 18, and an auxiliary link 28, pivoted at 29 upon said frame, these two links 26 and 28 being connected by means of a second auxiliary link 30, pivoted at 31 to the link 28, and at 32 to the link 26. To enable the throw or operative movements of the linkage system to be varied the connection between the link 30 and the links 26 and 28 may be adjustable; in the illustrated example this is accomplished by providing the link 30 with a plurality of holes 30ª for the accommodation of the pivot 31. The main link 26 is continued in the form of a projection or hook 34, which extends into the path of rotation of the pins 25 or their equivalent, while the auxiliary link 28 carries a pawl 35, pivoted at 36 and controlled by means of a leaf spring or similar device 37, whereby said pawl is permitted to yield in one direction, as will appear more fully hereinafter. A stop 38 is provided on the auxiliary link 28 for arresting the pivotal movement of the pawl 35 under the tension exerted by the spring 37, while a stationary stop 39 is provided on the frame 18, as shown in Fig. 4, to arrest the movements of the links 26 and 28 in a return direction, to their normal positions; a spring 41 is connected at one end with the link 26 and at its other end with the frame 18 for the purpose of returning the linkage system to its normal position. The pawl 35 co-operates with a ratchet wheel 42, fixed upon the shaft 17 to move with the dial 13.

In its preferred form, the timing apparatus further includes means whereby the dial 13 or its equivalent is locked in its successive positions of rest, this means serving to definitely locate the successive sectors 14 in proper registry with the sight opening 11. In the form shown in the drawings, the locking means in question is controlled by the aforesaid linkage system and comprises a sliding cam 43, forming part of or carried by a slide 44, slidably mounted on the frame 18 and pivotally connected by means of a pin 33 with the link 26, said pin 33 extending through a curved slot 33ª formed in the frame 18, as shown in Fig. 2. The sliding cam 43 is forked and straddles the reduced portion 45 of a plunger 46, slidably mounted in the frame 18 and controlled by means of a coil spring 47, which bears with one end against the frame 18 and with its other end against the collar 48 fixed upon the plunger 46. With this arrangement shoulders 49 are formed by the reduced portion 45 on the plunger 46 against which the cam 43 is effective to slidably shift the plunger 46 against the tension of the spring 47. For co-operation with said plunger 46, the dial 13 is provided with a series of spaced recesses 50 arranged in a circle about the axis of rotation of said dial, and in the illustrated example, being formed in a member or boss 51, fixed upon the inner face upon the dial 13, or comprising an integral part thereof; if desired, a leaf spring 52 located on the frame 18 may bear against the face of the boss or member 51 to frictionally retard the rotation of the dial 13, and thereby prevent spinning or overrunning of such dial.

In addition to the parts so far described, means is provided for automatically stopping the clockwork 20 at the end of each complete revolution of the dial 13, said means being capable of being manually operated at will to start said clockwork 20; in the form shown in the drawings, this means comprises a projection 53 and a co-operating aperture 54, with which the master gear 24 is provided for the accommodation of the plunger 53, these elements being so located with respect to each other, that the clockwork 20 will automatically be brought to a stop at the end of one complete revolution of the dial 13. The projection 53 is spring controlled and is carried by a member 55 secured by rivets or similar fastening means 56 to the frame 18, and maintained under a constant spring pressure tending to force the projection 53 into the aperture 54 by means of a leaf spring 57; the manual means whereby the member 55 is actuated against the tension of the spring 57 to withdraw the projection 53 from the aperture 54 at will, comprises a rod 58 slidably mounted in the frame 18 and connected at one end with the member 55, and having at its other end a push button 59 whereby operation of the parts is facilitated. A suitable stop 60 may be provided on the frame 18 for arresting the movement of the member 55 by the push button 59 and rod 58, as shown in Figs. 2 and 3.

To simplify the description, the operation of the apparatus will be set forth with respect to the dental clock shown in the drawings, it being understood that the operative steps will correspond in other forms to the apparatus designed for other purposes. In the normal position of the parts shown in Fig. 1 of the drawing, in which the dial 13 is in its initial position, the inscription on the sector 14, which is visible through the sight opening 11 reads "Load tooth brush." When it is desired to time the brushing operation and to properly brush the teeth in accordance with recognized scientific standards, the tooth brush is loaded with a conventional tooth paste or its equivalent, and the apparatus is set in motion by pressing inwardly upon the push button 59 to thereby shift the member 55 against the tension of the spring 57 and withdraw the projection 53 from the aperture 54 of the master gear 24, it being understood that the spring 21 has previously been properly wound. As soon as the projection 53 is completely out of the aperture 54, the clockwork 20 will start to run and cause the master gear 24 to be rotated in a direction whereby the pins 25 or their equivalent will successively act upon the linkage system in a manner to intermittently rotate the dial 13 in successive steps. In the specific apparatus illustrated, each pin 25 will successively engage the hook 34 and by exerting a lifting action thereon will pivotally move the main link 26 in an upward direction against the tension of the spring 41. This movement is transmitted by the auxiliary link 30 to the auxiliary link 28, which is correspondingly moved on its pivot 29; this upward movement of the linkage system continues until a given pin 25 passes from beneath the hook 34 because of the continued rotation of the master gear 24. As soon as this occurs, the links 26, 28 and 30 are pivotally moved downwardly back to their initial positions by the action of gravity assisted by the spring 41. As the upward movement of the linkage system takes place, the pawl 35 by engagement with a tooth of the ratchet wheel 42 will ride along said tooth and thereby be caused to pivotally swing on its pivot 36 against the tension of the spring 37 until said pawl passes above said ratchet tooth, whereupon it snaps into engagement with said tooth under the influence of its spring 37. As the pawl 35 is thus in engagement with the active face of a tooth of the ratchet wheel 42 when the return downward movement of the linkage system takes place, it will be obvious that the ratchet wheel 42 will be advanced one step during such downward movement; this advance of said ratchet wheel 42 is transmitted to the shaft 17 and by the latter to the dial 13, and serves to bring the next successive panel or sector 14 into registry with the sight opening 11, and thus brings into view the inscription on this particular panel or sector 14. The inscription in question is appropriate to the next step in the tooth brushing operation, and remains in view during the fraction of the operative time period, during which the particular step in the brushing operation is to be continued. As the aforesaid upward movement of the link 26 takes place, the slide 44, because of its connection with said link, will be correspondingly moved in an upward direction and thereby will cause the cam 43 to exert a pressure on the shoulders 49 in a direction to move the plunger 46 against the tension of the spring 47 and withdraw said plunger 46 from the recess 50, in which it previously was located. The dial 13 is thus released for rotation, the operative steps in question being so timed that this release takes place in time to permit the dial 13 to be rotated one step by the action of the pawl 35 and ratchet wheel 42. As the linkage system is returned to its normal position, the slide 44 and cam 43 are correspondingly moved downwardly to permit the spring 47 to force the plunger 46 into the next successive recess 50, whereby the dial 13 is again locked in position during the fraction of time in which the next successive sector 14 and its inscription are in registry with the sight opening 11. These operations are continued to bring the successive panels or sectors 14 of the dial 13 successfully into view through the sight opening 11 and to maintain them at rest in such positions for the predetermined fractions of the time period represented by one complete revolution of said dial. As each sector 14 becomes exposed to view through the sight opening 11, the tooth brush will be manipulated in the directions indicated by the arrow or arrows 16 which appear in such sectors. When the dial 13 has made one complete revolution and the first sector 14 again comes into registry with the sight opening 11, the projection 53, under the influence of the spring 57, will be forced into the aperture 54 of the master gear 24 and thus will automatically bring the clockwork 20 to rest and stop the apparatus.

The dental clock in question not only properly times the tooth brushing operation in accordance with recognized standards, but graphically instructs the person using the apparatus in the proper brushing of the teeth. For this purpose, the mouth is divided into eighteen parts, each of which is represented by one of the panels or sectors 14 of the dial 13, and the inscriptions 15 in such sectors. Each sector contains an appropriate inscription 15 explaining how to brush the teeth and gums properly, and remains in view through the sight opening 11 long enough to insure a scientific and thorough cleaning of the teeth. The sectors 14 are correctly timed and vary in their positions of rest in accordance with the mouth location to which they appertain. The arrows 16 indicate proper manipulation of the tooth brush to obtain the most efficient and satisfactory results in the brushing operation. As it is well known in the science of dentistry that a clean tooth never decays and that gums with a normal blood circulation will not become diseased, it will be apparent that the dental clock illustrated and described herein provides a very useful and efficient apparatus for guaranteeing proper treatment of the teeth with the tooth paste or its equivalent and the tooth brush. Generally speaking, the tooth brush and tooth paste or its equivalent are used incorrectly and for too short a period of time, so that proper benefit is derived from neither and suffering from decayed teeth and diseases of the gums quickly follows, even though the tooth brush and a tooth paste or its equivalent is used daily; all of this is easily overcome if the timing apparatus shown and described herein is utilized to time and direct the brushing operation. While the timing apparatus is particularly designed with respect to the operation of brushing the teeth, it will be obvious that it may be used with equal efficiency for other purposes.

Various changes in the specific forms shown and described may be made within the scope of the claims without departing from the spirit of the invention.

I claim:

1. A timing apparatus comprising a casing provided with a sight opening, a rotatable dial movable across said opening, and divided on its one face into a plurality of sectors containing appropriate inscriptions, a driven master gear, a plurality of pins carried by said master gear and projecting from a face thereof at spaced intervals, a ratchet wheel connected with said dial, a linkage system arranged to be intermittently operated by said pins, a pawl yieldingly mounted on said linkage system and co-operating with said ratchet wheel to intermittently rotate said dial at predetermined intervals of a given time period to bring the sectors thereof successively into view through said opening, a member connected with said dial and provided with a plurality of spaced recesses, a spring-pressed latch co-operating with said recesses to lock said dial against rotation whereby the sectors of said dial are successively maintained at rest in registry with said opening for predetermined fractions of said time period, a cam-member operated by said linkage system to withdraw said latch from said recesses at the expiration of said fractions of the predetermined time period and means for automatically arresting the operation of said master gear at the end of said predetermined time period.

2. A timing apparatus comprising a casing provided with a sight opening, a rotatable dial arranged to make one complete revolution across said opening in a predetermined time period, and divided on its one face into a plurality of sectors containing appropriate inscriptions, a driven master gear provided with an aperture, a plurality of pins carried by said master gear and projecting from a face thereof at spaced intervals, a ratchet wheel connected with said dial, a linkage system arranged to be intermittently operated by said pins, a pawl yieldingly mounted on said linkage system and co-operating with said ratchet wheel to intermittently rotate said dial to bring the sectors thereof successively into view through said opening, means controlled by said linkage system for locking said dial against rotation and for releasing it, and means co-operating with the aperture of said master gear for controlling the stopping and starting of said gear.

In testimony whereof I have hereunto set my hand.

EDWIN SPENGEMAN.